(No Model.)
W. H. BALDWIN.
Churn.
No. 230,687. Patented Aug. 3, 1880.
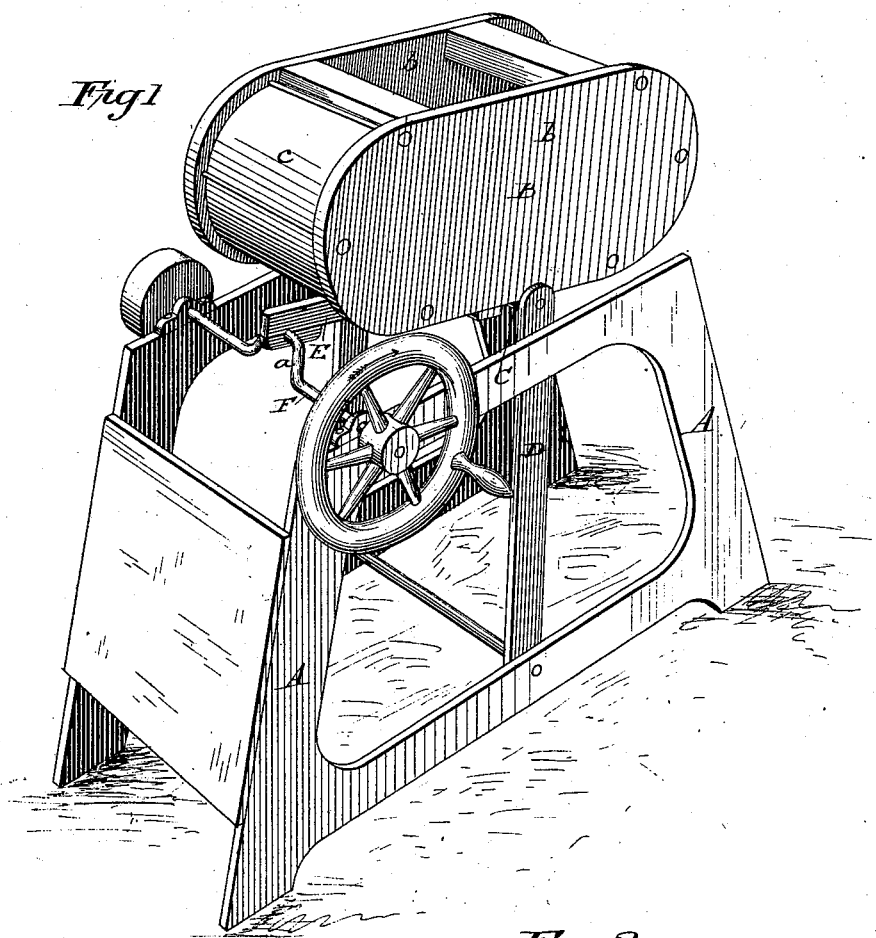
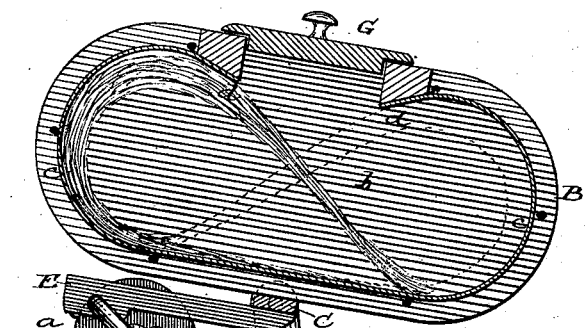
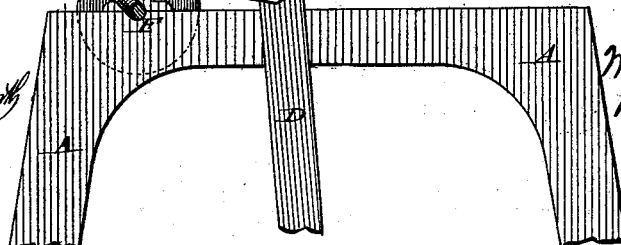

UNITED STATES PATENT OFFICE.

WILLIAM H. BALDWIN, OF OTTAWA, ONTARIO, CANADA.

CHURN.

SPECIFICATION forming part of Letters Patent No. 230,687, dated August 3, 1880.

Application filed June 5 1880. (No model.)

*To all whom it may concern:*

Be it known that I, WILLIAM H. BALDWIN, of Ottawa, in the Province of Ontario and Dominion of Canada, have invented certain Improvements in Churns, of which the following is a specification.

My invention relates to churns; and it consists in providing the same with a body having curved ends and internal deflectors, mounting said body in an upright swinging support, and imparting to it a combined rocking and swinging motion by means of a crank, as hereinafter explained.

In the accompanying drawings, Figure 1 represents a perspective view of my improved churn, and Fig. 2 a longitudinal vertical central section of the same.

The object of my invention is to cause the milk to be thrown violently back and forth within the body of the churn, and to describe in its course the figure 8. To accomplish this object the body is pivoted midway between its ends, so that it may rock, the pivots being arranged in swinging supports in order that the body may also swing back and forth, and the body being connected with a crank by which the compound movement is produced. The interior of the body is also furnished or formed with curved or inclined deflectors, which cause the milk to change or modify its course.

The construction and operation will be better understood upon referring to the accompanying drawings, in which A represents a stout frame, of wood or other suitable material and of convenient form, and B the body of the churn, within which the milk is placed. The body B is furnished on its lower side, midway between the ends, with a supporting cross-bar, C, the ends of which are journaled in the upright arms of a swinging supporting-frame, D, pivoted at its lower end in the frame A, as shown. Rigidly attached to the cross-bar C or to the body B is a longitudinal arm or bar, E, the outer end of which is connected with the crank *a* of a transverse shaft, F, mounted in bearings on the frame A, and furnished with a crank-wheel or driving-pulley, as indicated. By rotating the shaft in the direction indicated by the arrow the body B is caused to rock upon its pivots or supporting-shaft, and to simultaneously move forward, the advancing or forward end of the body being thrown down. A continuation of the rotation of shaft F reverses the direction of movement of the body, and simultaneously rocking the same upon its pivots causes the opposite and now advancing or forward end to be depressed.

The body B, which may be of any suitable material, but which is preferably formed of wooden side pieces, *b*, and an intermediate metallic portion, *c*, bent up to form the bottom, ends, and top, with the exception of the opening left in the latter, is formed with rounded ends, as shown, in order that the milk when thrown to one end shall be directed upward and back toward the opposite end; and in order that the milk may not be permitted to travel from end to end along the top, but that it shall instead be thrown from the upper side at one end to the lower side at or near the opposite end at each movement, thereby describing a figure 8, the interior of the body is formed as shown in Fig. 2, with deflectors or downwardly-curved portions *d* on the upper side. These deflectors cause the milk to take the direction indicated in Fig. 2, and prevent the possibility of its taking any other direction so long as the shaft is turned in the proper direction. The deflectors may be simply curved, beveled, or inclined strips of wood, metal, or other material, or may be formed, as shown in the drawings, by simply curving down the metal *c* of the body and supporting it by suitable backing; or the cover G, which is provided to close the opening in the upper side of the churn, may have the deflecting-surfaces formed upon or attached to its under side and arranged to extend downward into the chamber.

It is apparent that instead of pivoting the body B at its lower side the pivots may be at the upper side; but the arrangement shown is preferred, for the reason that the weight of the body and its contents is caused to assist in producing the sudden throw of the milk which so greatly facilitates the action of the churn.

It is likewise apparent that deflectors may be arranged upon the bottom as well as upon the upper side of the body or chamber; but these I do not deem ordinarily necessary.

A cam or other well-known mechanical equivalent may be substituted for the crank, and the precise construction of details represented may be modified in various ways, which will suggest themselves to the skilled mechanic.

It is highly important that the body of the churn be formed with curved ends, for even with the aid of the deflectors and the peculiar motion described the best results and most efficient action of the churn can only be secured when the several features are combined.

I am aware that it is not new to form a churn box or body with curved ends, that internal deflectors have been used in churns, and that a combined rocking and swinging motion has been imparted to a churn box or body; and I lay no broad claim to any of said features separately considered.

I am not aware, however, that any one has hitherto constructed a churn in which a body having curved ends was provided with means for imparting to it the peculiar motion herein described; nor am I aware that a body having such motion imparted to it has ever before been provided with internal deflectors, or adapted to permit the movement of the cream in the course given it in this.

Having thus described my invention, what I claim is—

1. The herein-described churn, consisting of the swinging support D, the body B, having curved ends and pivoted in said support, and the crank connected with the body, as described and shown.

2. In combination with the swinging support D and crank $a$, the body B, having curved ends and provided with internal deflectors, $d$, as shown, whereby the cream is caused to describe in its course the figure eight (8).

WILLIAM H. BALDWIN.

Witnesses:
WILLIAM W. DODGE,
P. T. DODGE.